Nov. 16, 1954     W. F. SPANG     2,694,222
MEAT EXTRUDING APPARATUS
Filed Dec. 15, 1951
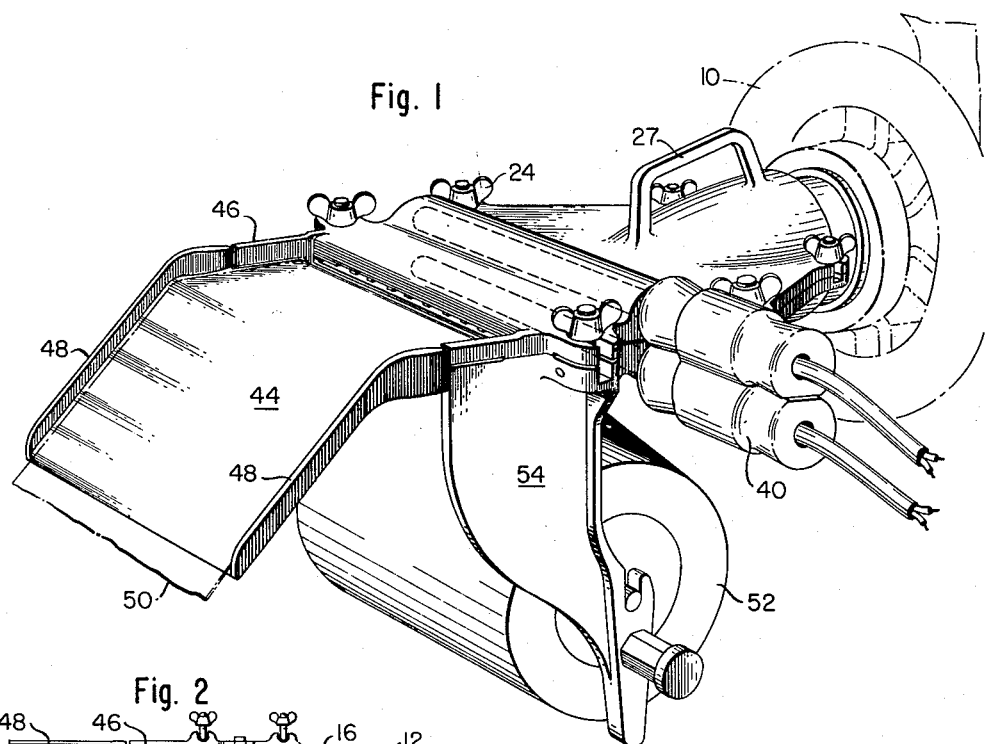
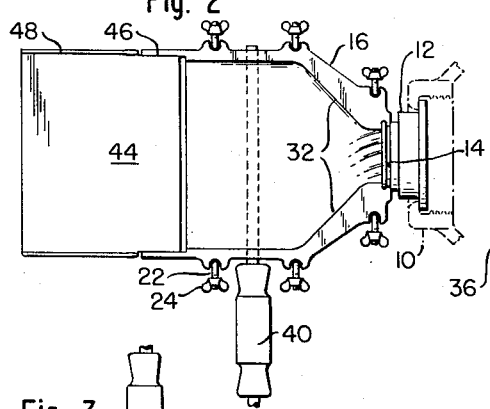
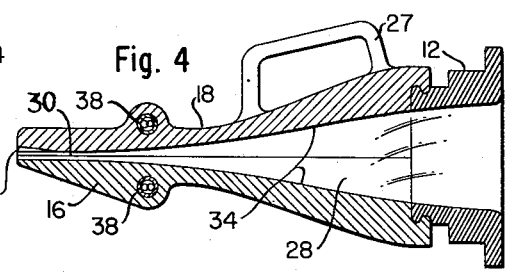
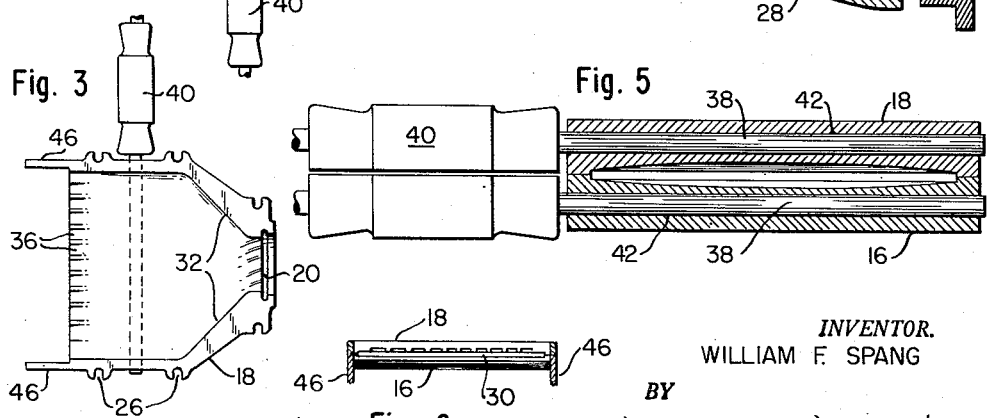
*INVENTOR.*
WILLIAM F. SPANG
BY
Kenway, Jenney, Witter & Hildreth
ATTORNEYS

United States Patent Office 2,694,222
Patented Nov. 16, 1954

2,694,222

MEAT EXTRUDING APPARATUS

William F. Spang, Medfield, Mass., assignor to Needham Manufacturing Company Inc., Needham Heights, Mass., a corporation of Massachusetts Application December 15, 1951, Serial No. 261,822

6 Claims. (Cl. 17—32)

This invention relates to apparatus for extruding ground meat and like products, and more particularly meat fat, into a flat strip of predetermined width. In preparing roasts and the like, a strip of fat is wrapped about and tied to the roast to retain the juices and aid in cooking and producing a superior meat product. The primary object of the invention is to produce an improved machine for extruding uniform strips of fat for this purpose.

The apparatus may be employed as an attachment to a meat grinding machine and as thus constructed is adapted to receive ground meat from the machine and mold it to strip form as it is forced therethrough and through a final molding slot by the meat grinding apparatus. Ground fat is soft, very pliable and easily molded to strip form. A novel feature of my invention resides in the provision of heating means at the slot for heating its walls and thereby facilitating the molding and extruding operation and producing a superior product, all as hereinafter more specifically described.

These and other features of the invention will be best understood and appreciated from the following description of a preferred embodiment thereof selected for purposes of illustration and shown in the accompanying drawings in which—

Fig. 1 is a perspective view of an apparatus embodying the invention,

Fig. 2 is a plan view of the apparatus on a reduced scale with the upper half removed, Fig. 3 is an inverted plan view of the upper half, Fig. 4 is a vertical longitudinal sectional view through the apparatus, Fig. 5 is a vertical transverse section through the apparatus along the heat rods, and Fig. 6 is a delivery end view of the machine.

In the drawing, 10 indicates the clamping ring at the delivery end of a meat grinding machine and 12 indicates an annular adaptor secured to the grinding machine by the clamping ring. The free end of the adaptor is annularly grooved at 14 to receive and support the attachment comprising the invention.

The extruding apparatus comprises a lower half 16 and a complemental upper half 18 both channeled at 20 at their meat receiving ends to engage within the annular groove 14. The lower half 16 carries a plurality of pivoted bolts 22 with wing nuts 24 and the upper half 18 is provided with open slots 26 to receive the bolts, thus the two halves can be secured together to form a unit housing clamped onto the grinding machine as shown in Fig. 1. The upper half 18 is provided with a lifting handle 27.

The upper and lower members 16 and 18 are recessed in complemental halves to provide a chamber 28 extending through the housing and open at its receiving and delivery ends. The delivery end opening 30 of the chamber comprises a relatively wide and shallow rectangular slot which also preferably has substantial length longitudinally of the chamber 28. The side walls of the chamber diverge outwardly horizontally at 32 from the receiving end toward the slot and the walls between the side walls converge at 34 from the receiving end toward and merge into the slot in a manner adapted to mold the meat into a flat horizontal ribbon as it passes through the chamber toward and through the slot. The mouth end of the slot is somewhat widened by cutting inclined channels 36 in the member 18. This relieving of the slot permits the compressed meat to gradually expand as it approaches the exit and the channels serve to guide the strip of meat straight through the slot.

The primary function of the machine is to extrude uniform strips of fat for use in wrapping about meat roasts and it is highly desirable that such strips shall be of uniform thickness and have a smooth and uniformly flat exterior surface. To the end of producing a superior product embodying these features and facilitating the molding and extruding operation, I provide heating means on the housing above and below the chamber 28 and slot 30 for maintaining the walls at a constant desired temperature. The meat is most highly compressed when it reaches the slot 30, and the function of the heaters is to keep the slot walls warm and thus facilitate the smooth passage of the meat through the slot. The disposing of the heaters in substantially straight paths across the housing above and below and adjacent to the slot together with the relatively long length of the slot, serves to form a smooth and even surface on the product during its passage through and in contact with the walls of the slot. The converging walls 34 merge into the slot as illustrated in Fig. 4 and the heaters are located substantially at the junction of the walls 34 with the slot.

The heating means illustrated in the drawing comprises two electric heating rods 38 each provided with a handle 40 and slidable within a bore 42. The two bores 42 for receiving the rods are disposed transversely through the two members 16 and 18 between their outer and inner walls. The bores are located adjacent to the converging walls 34 at the meat receiving end of the slot inwardly from its delivery end. As thus disposed the rods heat the walls of the slot and the surface of the formed strip.

The ground fat is homogenous throughout and is ordinarily at a temperature approximating 40° F. I have found that the best product is produced when the extruding apparatus is at room temperature, approximating 70°. When fat is extruded through my machine at room temperature and without heaters, the first few feet of the extruded fat will be uniform and smooth and highly satisfactory, but will then become irregular and entirely unsatisfactory as the fat cools the contacting walls of the apparatus. The primary function of the heaters is to furnish sufficient heat to maintain the walls at approximately room temperature and thereby cause the machine continuously to produce the highly satisfactory product. Melting of the fat is undesirable and my improved apparatus eliminates any such melting which ordinarily requires a temperature approximating 94° to 96° F. As illustrated in Fig. 4, the slot 30 from its delivery end to the converging side walls 34 is relatively long and meat passing through the slot therefore has a substantial period of contact with the slot walls which thereupon serve to extrude the meat with uniformly flat and smooth surfaces.

In using my machine, the operation is started with the apparatus at a temperature approximating 70°. As the relatively cooler fat is extruded through the slot 30 the heaters provide sufficient heat to maintain the walls at the desired room temperature. At this temperature the walls warm the fat at the contacting surface sufficiently to provide lubrication without melting and produce an easy and smooth flow of the fat through the slot.

Each bore 42 is disposed in a straight line through its housing unit between the outer and inner walls and parallel with the slot 30. The two rods are freely slidable within the bores and are substantially equal in heating capacity. Also each rod is of uniform heating capacity along its length. The slot walls are thus uniformly heated entirely across the slot and produce a product having a smooth and uniform exterior throughout.

A strip receiving tray 44 is mounted on the member 16 to receive the strip from the slot 30 and vertical walls 46 carried by the unit 18 at each side of and extending rearwardly from the slot prevents undue spreading of the strip as it emerges from the slot. Vertical walls 48 on the tray extend rearwardly from and cooperate with the walls 46. A web 50 of suitable paper drawn from a roll 52 is fed onto the tray beneath the slot and is adapted to receive the strip thereonto. The roll 52 is supported by brackets 54 hung from the member 16.

Having thus disclosed my invention what I claim as new and desire to secure by Letters Patent is:

1. An apparatus for extruding ground meat and the like into a flat strip of predetermined width, comprising a housing having a chamber extending therethrough and open to provide feeding and delivery ends therefor, the opening at the delivery end being a relatively wide and shallow rectangular slot and the side walls of the chamber diverging outwardly horizontally from the feeding end toward the slot and the walls between the side walls converging from the feeding end toward and merging into the slot and adapted to mold the meat into a flat ribbon-like sheet as it passes through the chamber toward and through the slot, and heating means on and disposed in substantially straight paths across the housing above and below and adjacent to the converging walls and the slot for heating the converging and slot walls and the contacting surface of the meat passing thereover.

2. The apparatus defined in claim 1 in which said slot from its delivery end to the converging walls is relatively long to have a substantial period of smoothing contact with meat passing therethrough.

3. The apparatus defined in claim 1 in which the heating means is located at the junction of said converging walls with the meat receiving end of the slot inwardly from the delivery end thereof.

4. The apparatus defined in claim 1 in which the heating means above and below the slot is disposed in the housing between the outer and inner walls thereof.

5. The apparatus defined in claim 1 in which the housing has two transversely extending bores therein respectively above and below the slot and adjacent to the walls thereof, and two electric heating rods disposed within the bores.

6. The apparatus defined in claim 5 in which the two rods are substantially equal in heating capacity and each is of uniform heating capacity along its length.

References Cited in the file of this patent

UNITED STATES PATENTS

| Number | Name | Date |
|---|---|---|
| 2,209,824 | Louisot et al. | July 30, 1940 |
| 2,386,775 | Balzarini | Oct. 16, 1945 |
| 2,539,232 | Dempster | Jan. 23, 1951 |